April 27, 1937.  G. H. STILPHEN  2,078,349
WHEEL ALIGNING AND STEERING ANGLE TEST GAUGE
Filed Aug. 1, 1935   5 Sheets-Sheet 1
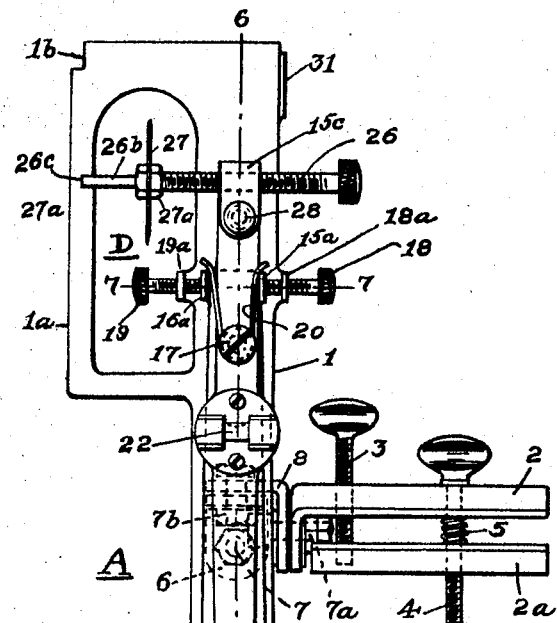
Fig. 1
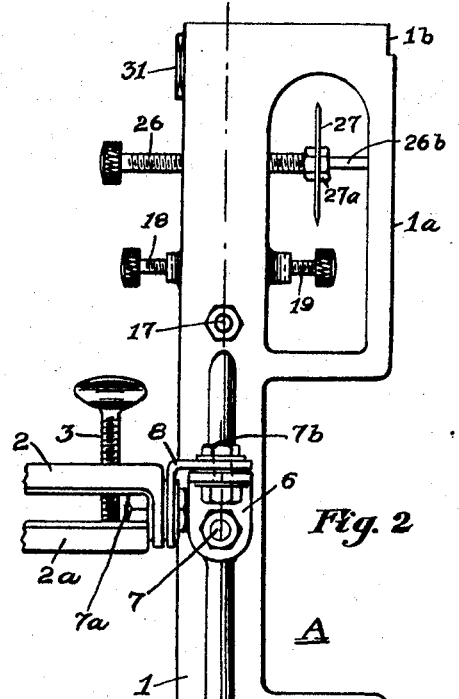
Fig. 2
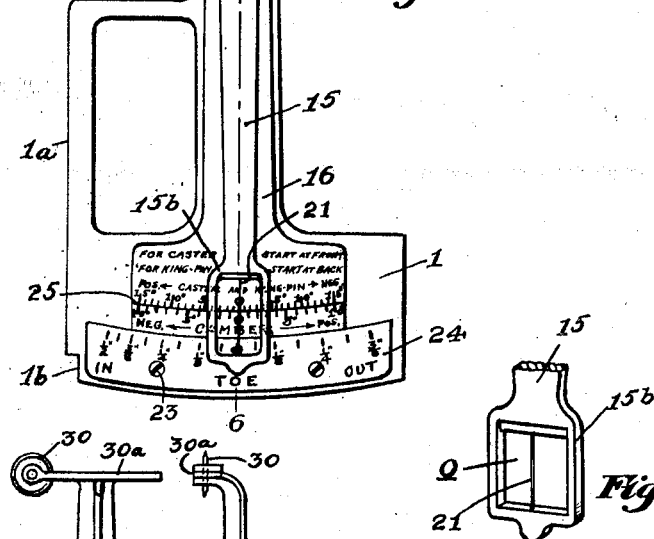
Fig. 1a
Fig. 4   Fig. 3
INVENTOR,
George H. Stilphen.
By Henry L. Chenery
Atty.

April 27, 1937.　　　G. H. STILPHEN　　　2,078,349
WHEEL ALIGNING AND STEERING ANGLE TEST GAUGE
Filed Aug. 1, 1935　　　5 Sheets-Sheet 2
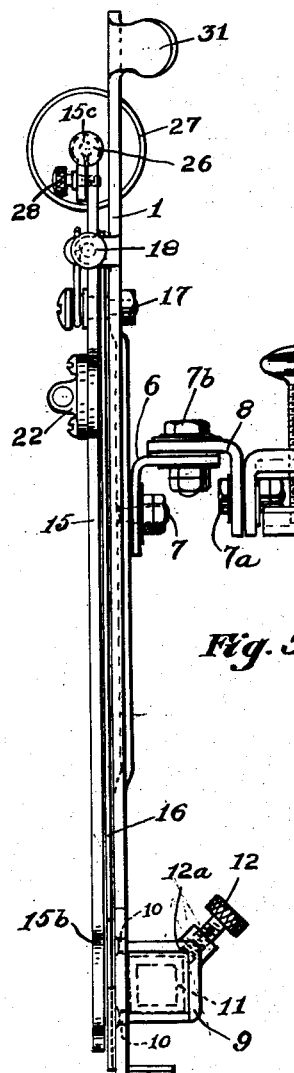
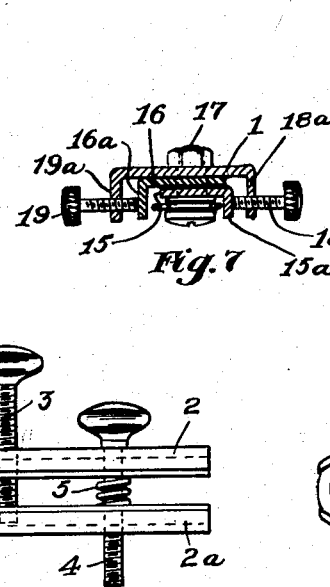
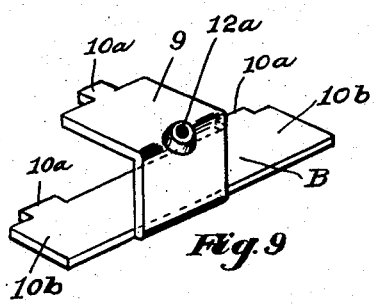
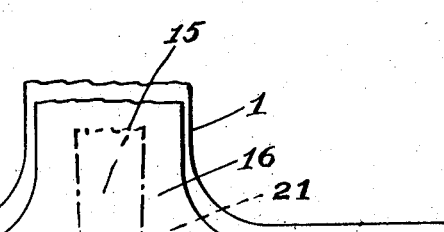
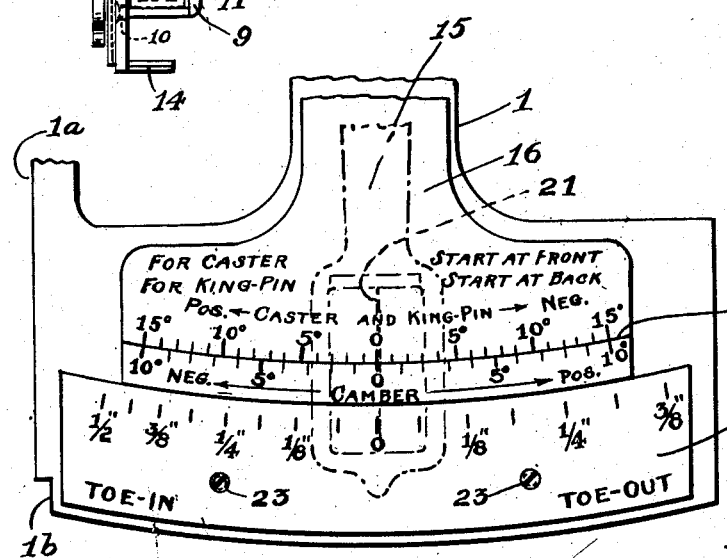
INVENTOR,
George H. Stilphen
By Henry L. Chenery.
Atty.

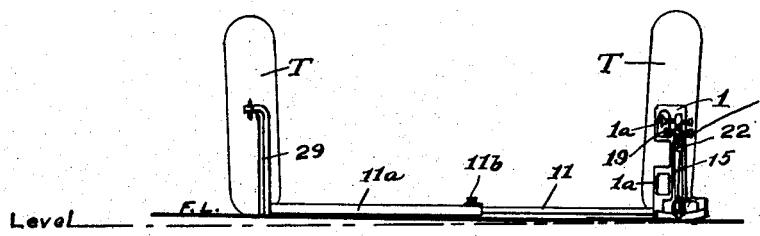
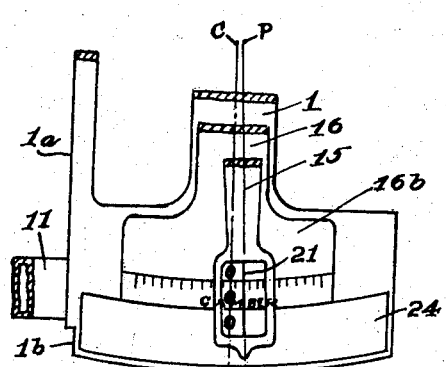
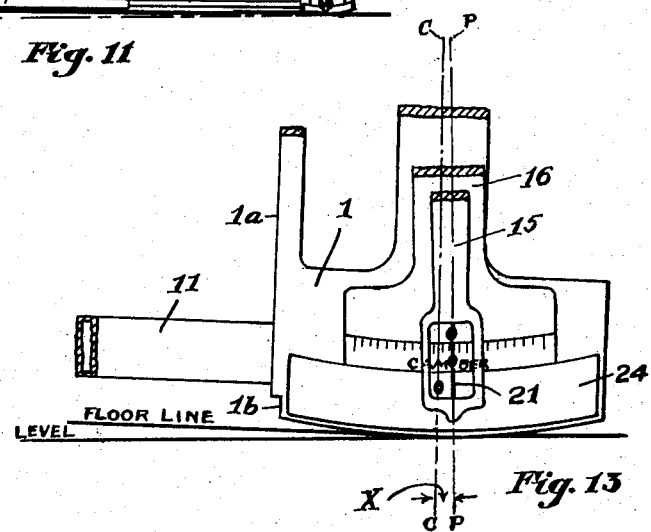
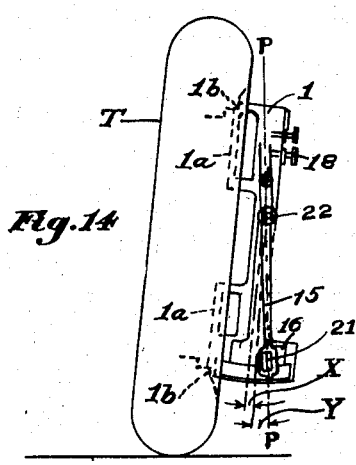
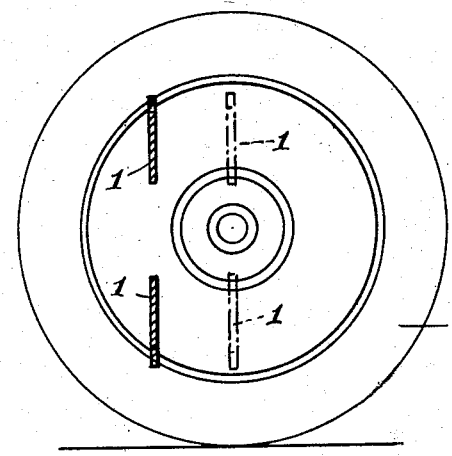
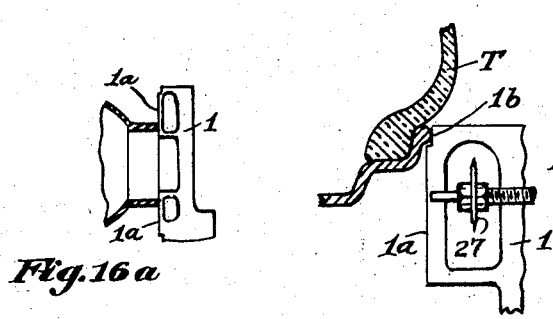

April 27, 1937.    G. H. STILPHEN    2,078,349
WHEEL ALIGNING AND STEERING ANGLE TEST GAUGE
Filed Aug. 1, 1935    5 Sheets-Sheet 4
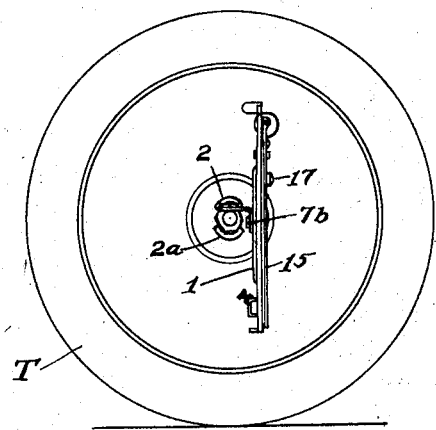
Fig. 17
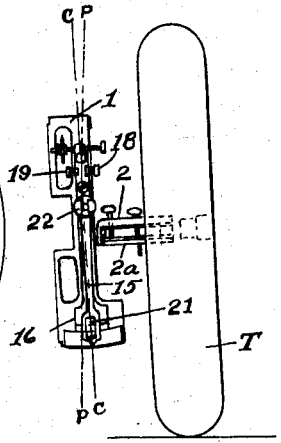
Fig. 18
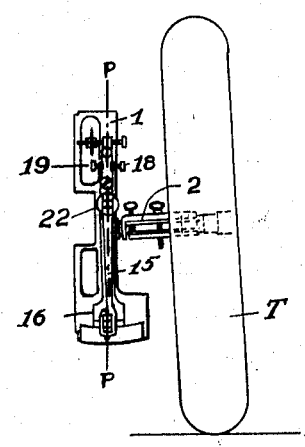
Fig. 19
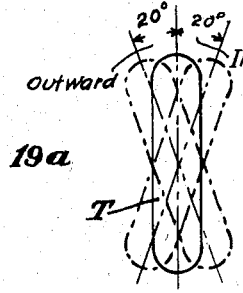
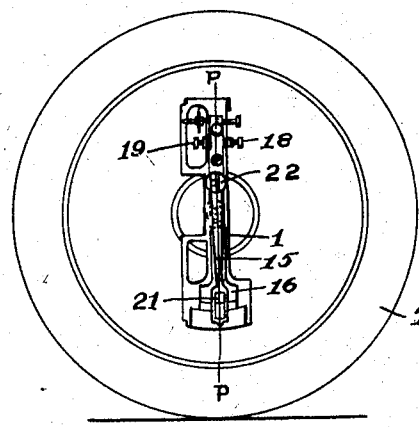
Fig. 20
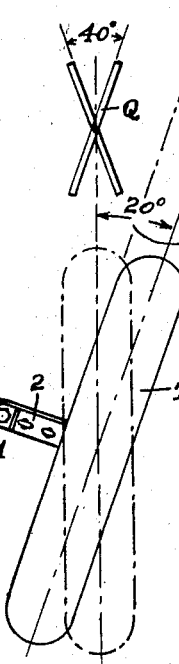
Fig. 22
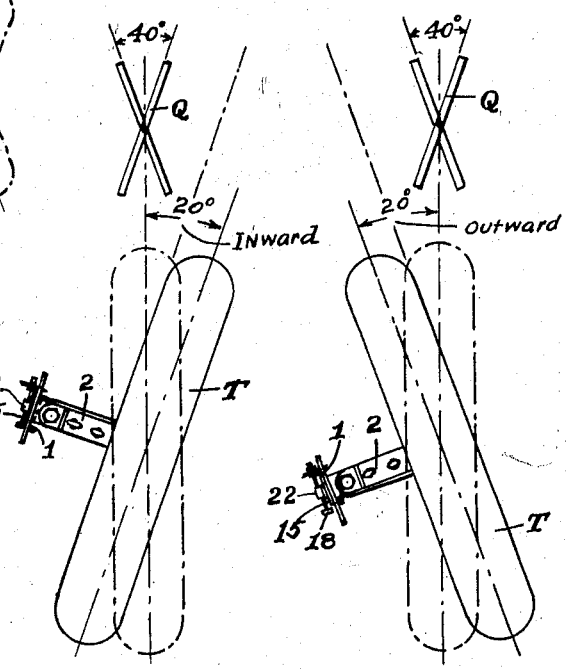
Fig. 21
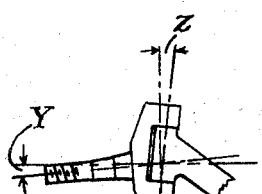
Fig. 22a
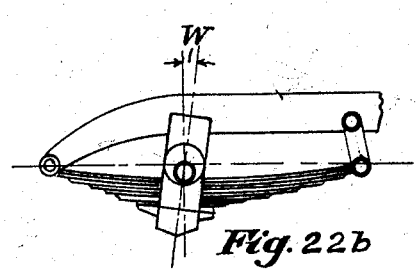
Fig. 22b
INVENTOR.
George H. Stilphen.
BY Henry L. Chenery
Atty.

April 27, 1937.  G. H. STILPHEN  2,078,349
WHEEL ALIGNING AND STEERING ANGLE TEST GAUGE
Filed Aug. 1, 1935  5 Sheets-Sheet 5
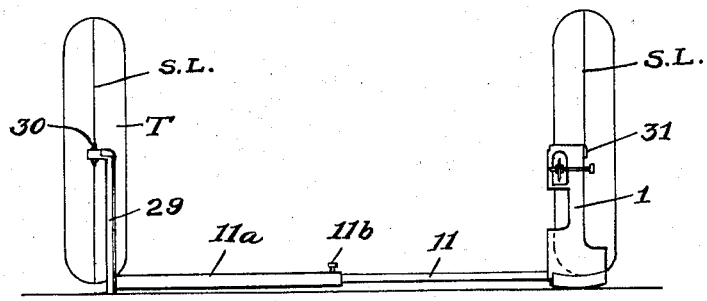
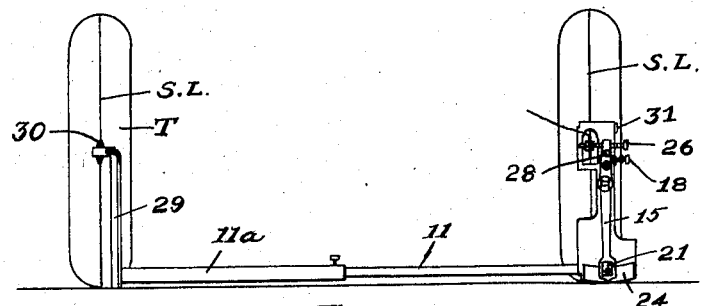
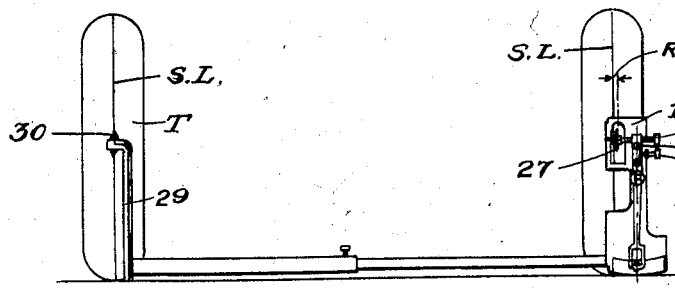
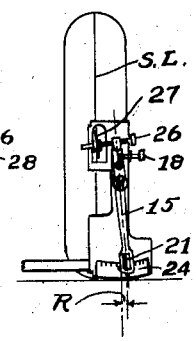
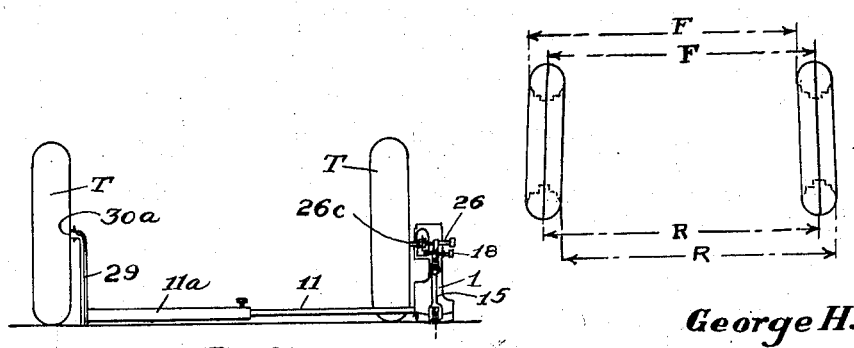
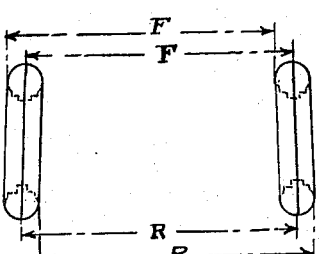
INVENTOR,
George H. Stilphen.
BY Henry L. Chenery.
Atty.

Patented Apr. 27, 1937

2,078,349

UNITED STATES PATENT OFFICE 2,078,349

WHEEL ALIGNING AND STEERING ANGLE TEST GAUGE

George H. Stilphen, Portland, Maine, assignor to Southworth Machine Company, Portland, Maine, a corporation of Maine Application August 1, 1935, Serial No. 34,230

10 Claims. (Cl. 33—203)

In designing motor vehicles, automotive engineers take into account several factors among which are weight, wheel-base, center of gravity and turning radius when making calculations for chamber, caster and kin-pin angles and toe measurements of the wheels. In this manner a proper balance between the parts, easy steering and minimum tire wear are attained.

Each individual manufacturer of motor vehicles has his own specifications relating to the above mentioned functions, and it is usual for this data to be compiled on charts for the information of garage mechanics in making repairs or re-adjustments to any of the disaligned parts occasioned by accidents or long continued use or abuse of the vehicle.

But to attempt to re-condition the wheel and steering parts and bring them back to their original angle-specification without the proper testing facilities is almost impossible of accomplishment; and it is with the object in view of supplying an apparatus capable of fulfilling the purpose just mentioned that I have conceived the present invention which deals with a device for testing camber, caster and king-pin angles, and toe-in and toe-out measurements in wheel and steering alignment operations.

The apparatus which, as a whole, I designate as a gauge, includes a standard, an indicator unit, and an interconnecting gauge-bar on one end of which the indicator unit is detachably mounted.

One particularly important feature of my apparatus resides in its ability to take camber angles while the vehicle is standing on an uneven or out-of-level floor. In most all other types of testing devices their builders insist on the work being done on level floors or racks.

Another outstanding advantage in my apparatus is its compactness. The indicating unit is so constructed that with no other independent implement, readings in functional angles may be taken by this single combination.

And still another feature inherent in the device is its accuracy, without which no indicating mechanism is worthy of consideration.

The character of the invention may best be understood by reference to the description found in the following specification when taken in connection with the accompanying drawings disclosing an embodiment which, at the present time, I consider preferable to other possible forms in which the invention might be carried out.

In the drawings,—

Fig. 1 is a front elevation of the indicator unit;

Fig. 1a is a perspective view of the lower end of the indicator arm;

Fig. 2 is a back elevation of the indicating unit;

Fig. 3 is a side elevation of the standard and gauge-bar;

Fig. 4 is an end elevation of the gauge-standard;

Fig. 5 is a side elevation of the indicator unit;

Fig. 6 is a sectional elevation, in part, of the indicator unit, the section being on line 6—6 of Fig. 1;

Fig. 7 is a section on line 7—7, Fig. 1;

Fig. 8 is an end view of the clamp element;

Fig. 9 is a perspective of the gauge-bar housing;

Fig. 10 is a view in front elevation of the lower end of the indicator unit;

Figs. 11, 12, 13, 14, and 15 are diagrams showing the gauge and indicator unit in fragmentary form as used in testing camber angles;

Figs. 16 and 16a illustrate two different methods of applying the indicator unit to the vehicle wheel in taking camber angles;

Figs. 17, 18, and 19 depict three positions of the indicator unit when testing for caster angles;

Fig. 19a shows, in plan view, the three positions of the wheel when taking caster angles;

Figs. 20, 21, and 22 disclose the three positions of the indicator unit in king-pin-angle-taking operations, Figs. 21 and 22 being in plan view;

Figs. 22a and 22b, respectively, are diagrams showing the vehicle elements and their angular positions with respect to camber and king-pin and caster angles;

Figs. 23, 24, 25, and 26 illustrate four positions of the gauge parts in toe measuring operations, taking the measurements from scribed lines on the tires;

Fig. 27 shows the first operation in taking toe measurements from the inside face of one tire to the outside face of the other, and Fig. 28 is a plan view of the two wheels with index lines indicating where measurements are taken in the two methods of taking toe, disclosed in Figs. 25 and 27.

Similar reference characters are employed to identify like parts in all the different views of the drawings.

Referring to Figs. 1 and 2 of the drawings, 1 is the back-plate of the indicator unit, having finished edge portions 1a, 1a, in vertical alignment, relatively, and disposed in parallel relation to the central vertical line 6—6 through the indicator parts.

The top and bottom ends of the back-plate 1 are notched as at 1b, 1b, these two latter edge faces being in relative vertical alignment and parallel with the line 6—6, and machine finished faces 1a, 1a.

The central, side portion of the back-plate is cut away, leaving a space A which permits of placing the indicator unit edge-wise against a wheel, the hub of the latter lying in the space A.

Secured to the back side of the back-plate 1 is a clamp member, including a swivelling jaw 2 and an adjustable or follow-up jaw 2a. The clamping effort is accomplished in the usual manner, by the use of the screws 3 and 4. A spring 5 is inserted over the screw 4, between the two jaws to keep them normally separated.

The clamp member is connected to the back-plate by a universal-joint construction, including an angle-plate 6 which is pivotally mounted on the back-plate by means of screw 7, an angle-plate 8 pivotally secured to the clamp jaw 2 by means of screw 7a, with a screw 7b making a pivotal connection between the two angle plates 7 and 8. It is thus possible to locate the indicator unit in any angular position, relative to the clamp, which is required.

On the back side of the back-plate is secured a gauge-bar housing member 9, shown in perspective view in Fig. 9. I preferably secure this member on the body portion of the indicator unit by making slots 10 in the back plate into which the lugs 10a of the housing are driven and then upset. The lower ends of the housing are extended, as at 10b, 10b, in order to provide a longer bearing surface for the telescoping gauge-bar member 11.

The face B of the housing is disposed at exactly 90 degrees from the central, vertical line 6—6 through the indicator unit. A screw 12, operating in the threaded hole 12a, abuts on the corner of the gauge-bar and thrusts it strongly against the back of the back-plate and the face B of the housing 9, which firmly and squarely locks the indicator unit on the gauge-bar when they are used in conjunction in taking angles in camber and measurements in toe.

An end stop flange 13 limits the inward movement of the gauge-bar in the housing, and a bottom flange 14 gives a greater supporting area when the indicator is resting on the floor during testing operations.

The foregoing description relates to the main element upon which the movable or gauging parts are mounted.

The gauge or indicating elements comprises an indicator arm 15 and an adjustable degree-plate 16, both of which are pivotally mounted on the back-plate over the pivoting bolt 17. The indicator arm is actuated by rotating the adjusting screw 18 and the adjustable degree-plate is swung by and through the use of the screw 19, the screws operating, respectively, in threaded lugs 18a and 19a.

A spring 20 mounted over the head of the bolt 17 makes contact with the ears 15a and 16a extending outwardly from the members 15 and 16, respectively, maintaining these ears in firm contact with the ends of the respective thumb screws 18 and 19.

The lower end of the indicator arm 15, as shown in perspective view in Fig. 1a, has an enlarged head 15b in which is an opening O. Within this opening, and aligning when viewed from the front of the indicator unit, with the central line 6—6, is a hair line wire 21.

Mounted on the member 15, immediately below its pivotally connected point on bolt 17, is a spirit level 22, this element being used to plumb the member 15 in various testing operations.

The lower end of the adjustable degree-plate is widened at 16b on each of its sides, and on this portion are graduations marked to register angles in degrees of caster, camber and king-pin inclination; and fixed to the front face of the back-plate by screws 23, immediately below the adjustable degree plate, is another plate 24 graduated to read, in fractions of an inch, the toe-in or toe-out of the front wheels of the vehicle. It will be observed that the graduations in all instances continue from the zero mark on each side of the central, vertical line, the degrees being designated on one side as "positive" and on the other as "negative", for camber, caster and king-pin inclination, and as "toe-in" and "toe-out" on the two sides, respectively, of the central line for indicating toe measurements. A line 25 separates caster-king-pin and camber graduations.

In the split upper end portion 15c of the indicator arm 15 is a threaded hole 26a within which operates the register screw 26. Fixed on this screw by the check nuts 27a and movable within the space D in the back-plate is a registering disc 27 used in connection with toe measurement testing to register with the scribed line on the periphery of a tire. The screw 26 and disc 27 may be locked and held against rotation by the clamping screw 28. It will be observed that the screw 26 has an extended portion 26b about which more will be said later on in this specification.

Due to the fact that the registering disc 27 is not in alignment with the pivoting bolt 17 and hair-line wire 21, the spacings of the graduations on the toe-plate 24 are not uniform. The indicia on the toe-plate are simply indicative of the actual amount, in fractions of an inch, of the toe of the wheels as represented by the difference between the measurements R and F, shown in Fig. 28.

Used in conjunction with the indicator unit is a gauge-bar adjustable to different lengths and comprising two members 11 and 11a, one member telescoping the other. On the end of the member 11 the indicator unit is detachably mounted, and on the outer end of the part 11a is fixed the gauge standard 29. The standard has on its upper end a disc 30 used when a line is to be scribed on a tire. Another tire-scribing element is disposed at the top of the back-plate, at 31.

In describing the operation of the gauge for testing the various functional angles, camber will first be considered.

Camber is the pitch of the forward wheels of a motor vehicle when they are pointing substantially straight ahead. Stated in another way it is the amount they slope inwardly at their bottoms, making the distance between the wheels at their lower portions less than the distance between them at corresponding points on their upper portions. Camber is usually figured in terms of degrees of the circle.

Manufacturers of wheel aligning and testing devices generally recommend but more often insist that their apparatus should be used for testing camber angles only when the wheels are standing on a perfectly level floor or checking rack. With the present invention this requirement is unessential, as provision is made to take care of this contingency.

The first operation in testing camber is to set the assembled gauge on the floor, in front of the wheels, adjusting the gauge-bar by releasing the locking screw 11b to bring the standard and indicator unit abreast, respectively, of the two wheels, as shown in Fig. 11.

Next plumb the indicator arm 15, using the screw 18 for the purpose. The indicator unit will now appear as seen in Fig. 12 in which the line P—P is the plumb line and C—C the central line through the unit, corresponding to line 6—6, Fig. 1. The angle X represents the number of degrees the floor is out of level.

Now move the adjustable degree plate, by actuation of the screw 19, so that the zero mark on the plate registers with the hair line wire 21 on indicator arm 15 (see Fig. 13).

At this point detach the indicator unit from the gauge-bar 11 by slacking screw 12.

Then with the wheel straight ahead place the unit against the side of the wheel, the shoulders 1b engaging the felly of the wheel, as shown in Figs. 14, 15, and 16. The indicator unit is held substantially perpendicular during this operation.

The final operation is to again plumb the indicator arm 15 and take the reading on the camber graduations, corresponding to angle Y in Fig. 14.

In Fig. 15 the two parts shown in sectional view represent the upper and lower portions of the indicator unit making contact with the felly of the wheel. An alternate method of applying the unit to the wheel is shown in dotted lines in the same figure, but in this instance contact is made with the hub of the wheel, as shown. Before making tests for wheel alignment the tires on both front wheels should be inflated to the same pressure.

Caster angles will now be considered and the operations involved in making the tests described, it being understood that the drawings show the left hand wheel being tested.

First attach the indicator unit to the wheel-spindle nuts as illustrated in Fig. 17, using the clamp shown in Figs. 1, 2, and 5, which form an integral part of the unit. The device will now appear as shown in Fig. 18 in side elevation.

Next, with the wheel straight ahead and the indicator arm 15 on the zero mark on toe-graduation plate 24, plumb the whole indicator unit, as illustrated in Fig. 19, by moving the unit bodily.

Then turn the vehicle wheel inwardly—which would be to the right (see Fig. 19a), preferably twenty degrees, using the cross-bar angle indicator Q which is first aligned with the wheel when the latter is pointing straight ahead.

The indicator arm 15 is now adjusted to perpendicular position, using the spirit level in all cases where plumbing is to be done, and the adjusting screw 18 for swinging the indicator arm. Then set zero mark on the degree plate 16b to register with the hair line wire on indicator arm 15, by using screw 19.

The vehicle wheel is now turned back forty degrees, or twenty degrees outwardly from the original setting. Adjust indicator arm to perpendicular position and take reading in degrees of caster on the caster graduations on adjustable degree plate 16, the number of degrees being those included in the space between the zero mark on the adjustable degree-plate and the hair line wire 21 on the indicator arm. To insure accurate readings, the graduations on the adjustable degree plate must be specially calibrated.

The operation in taking king-pin angles resembles quite closely that in making tests for caster except that, after the first operation of securing the indicator unit to the wheel spindle nuts, as shown in Fig. 17, the unit is swivelled on bolt 7b so that it stands at ninety degrees from that position in which it is used in caster testing, the king-pin position being depicted in Fig. 20.

After turning the wheel of the vehicle twenty degrees outwardly (see Fig. 21) the indicator arm 15 is plumbed. Zero mark on adjustable degree-plate 16 is now moved to hair line wire 21, the wheel turned inwardly forty degrees, and the indicator arm again brought into perpendicular position. Reading for king-pin inclination is now taken from the adjustable degree plate as was the case with caster angles.

In Fig. 22a the angle Y represents camber angle of the wheel, and angle Z the angle of inclination of the king-pin. Caster angle is represented by W in Fig. 22b.

One method of taking toe measurements is shown in Figs. 23, 24, 25, and 26. The wheels are first jacked up so that the tires clear the floor. The assembled gauge is then placed in front of the tires, the wheels spun, and the line-scribing elements 30 and 31 brought into contact with the periphery of the tires, making light scribed lines S. L.

Next bring hair line wire 21 into register with zero mark on toe plate 24, and lower the wheels to the floor. Bring the disc 30 into accurate register with the line it has just scribed and adjust gauge-bar 11 so that registering disc 27 is in near register with the scribed line on the opposite tire, after which accurately align the disc with the scribed line by actuation of the screw 26. Lock the screw 26 against rotation by tightening the clamp screw 28.

The gauge assembly is now moved to the rear of the tires, the scriber 30 and the disc 27 being reversed in position with respect to the tires.

With the scriber 30 on the scribed line on one tire, actuate the screw 18 to bring the registering disc 27 into accurate alignment with the scribed line on the other tire. The hair line wire 21 of the indicator arm 15 will thus have been swung a distance R on the indicator unit, and this distance as translated in terms of fractions of an inch as indicated on the graduations on the toe plate 24 corresponds to the actual distance the disc 27 travels, as represented by R', Fig. 25.

In other words, R' is the exact toe of the wheels, and in the present instance shows "toe-out", which of course is a faulty condition. Had the disc 27 been on the inside of the line S. L., Fig. 25, it would have shown "toe-in". Fig. 24 shows the apparatus in front of the tires and Fig. 25 behind them.

In the alternate method of taking toe measurements the stationary end 30a of the gauge standard is positioned to abut on the inside face of one tire, as shown in Fig. 27.

Adjust telescoping gauge-bar 11 so that the edges of the back-plate, at 1b, 1b, stand from the outer face of the other tire a short distance,—say ¼ inch.

With indicator arm 15 on zero mark on toe plate 24 adjust registering screw 26 so that the end 26c abuts on the side of the adjacent tire, and lock the screw by the use of clamp screw 28.

Now move the apparatus to the rear of the tires, placing the parts in the same relative position as they assumed when the assembly was disposed on the front of the tires.

By actuation of screw 18 the end of the screw, 26c, will be moved into contact with the outer side of the adjacent tire and the amount of movement will be recorded on the toe graduation plate 24 in fractions of an inch.

It will be noted by reference to Fig. 10 that on the adjustable degree plate 16 there are inscribed the terms "Pos" and "Neg." For instance, on the left of the word Camber is "Neg" and on its right is the term "Pos", meaning negative and positive, respectively. If the wheel was plumb the indicator arm 15, if moved to the perpendicular as determined by the bubble in the spirit level 22 would align its wire 21 with the zero mark on the toe graduation plate 24, but as camber is the most essential functional angle in the list the wheel when correctly disposed stands at a considerable incline from perpendicular, slanting outwardly. This brings the hair line wire 21 of the indicator arm on the right hand side of the zero mark, or toward the "Pos" end of the graduations. A bent wheel spindle or axle might bring the wheel into negative camber but otherwise only the positive side of the graduations would be used. The same applies with caster and king-pin angles.

It will also be observed that in taking caster angles the first operation is performed with the wheel turned inwardly while with king-pin testing this procedure is reversed—the first operation starts with the wheel turned outwardly.

The apparatus as described is a complete angle and measurement testing outfit, compact and self-contained. It requires no other instrumentalities or accessories in carrying out the objects for which it is designed. Not only is it a convenient and practical piece of apparatus, but an accurate one; and due to its peculiarly characteristic construction, embodying few parts which can be utilized to perform in various capacities it has a distinct advantage over other devices used for the same purpose but which require a large assortment of units to accomplish what the present invention does with comparatively few.

What I claim is:

1. A device of the class described comprising a telescoping gauge-bar, a standard fixed on and at one end of said gauge-bar, a scribing disc on said standard, an indicator unit detachably mounted on the opposite end of said gauge-bar, said unit embodying a back-plate, a scriber element on the back side of said back-plate, an indicator arm pivotally secured to, and disposed on the forward side of, said back-plate, a registering disc mounted on said indicator arm, and means to move said disc to, and secure it in, various positions on and transversely of said indicator arm.

2. A device of the class described comprising a standard having two feet transversely disposed, a tire-abutting shelf on the top of said standard, a gauge-bar secured at one end to the lower portion of said standard, a back-plate detachably mounted on the opposite end of said gauge-bar, a toe-plate, having graduation thereon, secured to and on the lower end of said back-plate, an indicator arm pivotally connected to said back-plate, the lower end thereof having an opening therein, a vertically disposed hair line wire stretched across said opening, centrally of said indicator arm, said hair line wire adapted to pass, during the swinging movement of said indicator arm, over said graduations on the toe-plate, plumb-indicating means on said indicator arm, a screw to actuate said indicator arm in one direction, and a tire-engaging member mounted on the upper end of said indicator arm and adaptable of transverse movement on and with respect to said indicator arm.

3. A device of the class described comprising a back-plate having two vertically spaced and mutually aligning straight edge portions, an adjustable degree-plate disposed on the front side of said back-plate, a plurality of sets of graduations on said adjustable degree-plate, an indicator arm disposed outwardly of said adjustable degree-plate, a pivoting bolt, over which said adjustable degree-plate and said indicator arm are swingingly mounted, secured in said back-plate, two ears on said back-plate each having a screw-threaded hole therein, two screws engaging, respectively, the threaded holes in said ears, the end of one screw abutting on the indicator arm and the end of the other screw contacting the adjustable degree-plate, said screws serving as positive means to swing said pivoted members in opposite directions, respectively, a double-acting spring to maintain constant contact of the pivoted members with the respective screws, and a graduated plate fixed on and at the lower portion of said back-plate, the zero mark thereon and the axis of said pivoting bolt being disposed in a vertical plane parallel to the said straight edge portions.

4. A device of the character described comprising a back-plate having a portion of one side cut-away, a toe-plate, having graduations representing fractions of an inch, secured to the lower portions of said back-plate, an adjustable degree-plate mounted to swing on said back-plate, said degree-plate having a plurality of sets of graduations representing degrees of the circle, an indicator arm disposed outwardly of and swinging from the same pivotal point as does said adjustable degree-plate, a head on the lower end of the indicator arm having an opening therein, a hair line wire stretched across said opening and disposed on the vertical, central line through said indicator arm, said wire swinging across all of said graduations, means independently actuated to positively move said indicator arm and said adjustable degree-plate in one direction, a spring serving in common to yieldingly maintain said pivotally mounted members in engagement with the said positive moving means, and a universal joint clamp member secured on the back side of the back-plate adapted to hold and maintain said device in any one of a plurality of positions, relative to the object being clamped.

5. A wheel-aligning and steering-angle-testing gauge for motor vehicles comprising a back-plate having a vertically central lateral portion cut away, leaving upper and lower straight-edge portions, a felly-engaging step on the upper and lower extremities of said straight-edge portions, an indicator arm pivotally attached to the back-plate at a point above the midway point of its height, a spirit-level mounted on said indicator arm, a toe-plate, having graduation in fractions of an inch thereon, fixed to the back-plate at its lower end, an adjustable degree-plate disposed superjacent said toe-plate, a clamp member jointedly connected to the back side of said back-plate, adapted, while embracing an object, to permit said back-plate and the elements mounted thereon to swing at various angles from perpendicular, both longitudinally and transversely of the object being clamped, and means on said indicator arm adapted to progressively register with the graduations on both of said plates, as said indicator arm swings in either direction.

6. A wheel-aligning and steering-angle test gauge comprising in combination an adjustable gauge-bar, a standard fixed on one end of the gauge-bar, a back-plate demountably disposed on the opposite end of said gauge-bar, an indicator arm pivotally secured on said back-plate, a hair line wire centrally disposed on and at the lower end of said indicator arm, a spirit-level mounted on said indicator arm, and a graduated index, including a zero-indicating mark, inscribed on the lower portion of said back-plate, said zero mark being disposed on a vertical plane cutting the pivotal point of said indicator arm, said vertical plane being normal to the base line of said gauge, meaning the contacting points of said standard and said back-plate with the floor.

7. A wheel-aligning and steering-angle test gauge having characteristics according to claim 6, and an adjustable degree-plate swinging from the same pivotal point as does said indicator arm, said adjustable degree plate having graduations thereon into which the hair line wire on said indicator arm may be brought into register.

8. A device of the class described adapted for use in wheel-alignment and steering-angle testing operations, comprising a gauge-bar, a standard fixed on one end of said gauge-bar, an indicator unit demountably disposed on the opposite end of said gauge-bar, said unit including an indicator arm, and means operative in conjunction therewith to indicate in degrees of the circle the relation of the base line of said device to the horizontal, when said device is standing on a floor.

9. A test gauge adapted for use in checking functional angles and measurements of wheels and steering parts of motor vehicles comprising an indicator unit; embodying a back-plate, an adjustable degree-plate having graduations thereon specially calibrated for camber, caster and king-pin inclination angles, an indicator arm having a hair line element therein, means on said indicator arm for plumbing it, a standard, and a telescoping gauge-bar sufficient in length to reach from one to the other of the forward wheels of the vehicle, said standard being secured on one end of the gauge-bar and said indicating unit detachably mounted on the other, said test gauge serving as a floor-level indicator when fully assembled and placed on the wheel-supporting surface in advance of the forward wheels of the vehicle, readings for camber then being taken, with the adjustable degree-plate centrally positioned on the indicator unit and the indicator arm plumbed.

10. A device of the character described adapted for use in testing motor vehicle wheels and steering parts for functional angles and measurements, comprising a gauge-bar, said gauge-bar being capable of reaching from one to the other of the two front wheels of the vehicle, a standard fixed on one end of said gauge-bar, an indicator unit detachably mounted on the opposite end thereof and embodying a back-plate having a specially calibrated toe-measuring scale on the lower end thereof, a clamp member on the rearward side of said back-plate adapted, when said clamp is fixedly secured to a vehicle element, to permit said indicator unit to be disposed in various positions and moving bodily with said vehicle element, an indicator arm pivotally secured on the front side of said back-plate, means for bringing said indicator arm into plumb position, said means being associated with a spirit level, and an adjustable degree-plate having specially calibrated scales thereon for indicating in terms of degrees camber, caster and king-pin inclination, direct readings being taken without deductions being made in caster and king-pin angle testing.

GEORGE H. STILPHEN.